(12) United States Patent
Nishida

(10) Patent No.: US 7,429,851 B2
(45) Date of Patent: Sep. 30, 2008

(54) CONSTANT VOLTAGE POWER SUPPLY CIRCUIT

(75) Inventor: Junji Nishida, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 60 days.

(21) Appl. No.: 10/583,264

(22) PCT Filed: Oct. 19, 2005

(86) PCT No.: PCT/JP2005/019641

§ 371 (c)(1),
(2), (4) Date: Jun. 14, 2006

(87) PCT Pub. No.: WO2006/043707

PCT Pub. Date: Apr. 27, 2006

(65) Prior Publication Data

US 2007/0146057 A1    Jun. 28, 2007

(30) Foreign Application Priority Data

Oct. 22, 2004    (JP) .............................. 2004-308369

(51) Int. Cl.
*G05F 1/46*  (2006.01)
*G05F 3/08*  (2006.01)

(52) U.S. Cl. ...................... 323/266; 323/225; 323/226; 323/303

(58) Field of Classification Search ................ 323/234, 323/266, 268, 313, 314, 225, 226, 303
See application file for complete search history.

(56) References Cited

U.S. PATENT DOCUMENTS 6,483,727 B2    11/2002    Oki et al.
6,693,805 B1 *    2/2004    Steigerwald et al. .......... 363/39

(Continued)

FOREIGN PATENT DOCUMENTS

JP    48-37654    6/1973

(Continued)

OTHER PUBLICATIONS

Aug. 24, 2007 Korean offical action (with English translation) corresponding to Korean patent application No. 10-2006-7012093.

(Continued)

*Primary Examiner*—Gary L Laxton
(74) *Attorney, Agent, or Firm*—Cooper & Dunham LLP

(57) ABSTRACT

A disclosed constant voltage power supply circuit (1) has an input terminal (Vdd), an output terminal (Vout), a constant voltage power supply unit (2) that generates a constant voltage (Vo1) with a ripple voltage (Vri), and a ripple removing circuit unit (3) for removing the ripple voltage so that a constant voltage (V1) without the ripple voltage is output at the output terminal (OUT). The ripple removing circuit unit comprises a resistor (R1) connected between the constant voltage power supply unit and the output terminal; a ripple voltage detection circuit unit (5) for detecting the ripple voltage and outputting a signal depending on the detected ripple voltage; and a current circuit unit (6, 7) for receiving the signal from the ripple voltage detection circuit unit and supplying a current (io1) to the output terminal or absorbing a current (io2) from the resistor in response to the received signal, so as to cancel the ripple voltage at the output terminal.

8 Claims, 5 Drawing Sheets

U.S. PATENT DOCUMENTS 7,233,130 B1 * 6/2007 Kay ............................ 323/222

FOREIGN PATENT DOCUMENTS

| JP | 57-204928 | 12/1982 |
| --- | --- | --- |
| JP | 05-095628 | 4/1993 |
| JP | 2000-059990 A | 2/2000 |
| KR | 10-0278096 | 1/2001 |
| TW | 312869 | 8/1997 |
| TW | 493317 | 7/2002 |

OTHER PUBLICATIONS

Mar. 25, 2008 Taiwanese offcial action (with English translation) in connection with corresponding Taiwanese application No. 94136715.

* cited by examiner

CONSTANT VOLTAGE POWER SUPPLY CIRCUIT

TECHNICAL FIELD

The present invention generally relates to a constant voltage power supply circuit, and especially relates to such a constant voltage-power supply circuit that can cancel a ripple voltage while maintaining high voltage efficiency.

BACKGROUND ART

In constant voltage power supply circuits including a constant voltage power supply unit, a ripple voltage is inherently generated in an output voltage of the constant voltage power supply unit due to a variety of causes. A ripple filter is known for removing such ripple voltage as disclosed in Patent Reference No. 1.

FIG. 5 shows a conventional constant voltage power supply circuit 100 using a ripple filter.

The constant voltage power supply circuit 100 comprises a constant voltage power supply unit 101 that generates and outputs a predetermined constant voltage, and a ripple filter 102 connected between an output end A and an output terminal OUTa.

The ripple filter 102 comprises an NPN transistor Qa, a resistor Ra and a capacitor Ca. The NPN transistor Qa has a collector connected to the output end A of the constant voltage power supply unit 101, an emitter connected to the output terminal OUTa, and a base connected to a node between the resistor Ra and the capacitor Ca. Another end of the capacitor Ca is grounded and another end of the resistor Ra is connected to the output end A of the constant voltage power supply unit 101. A time constant of the resistor Ra and the capacitor Ca is adjusted so as to be long enough compared with a frequency of the ripple voltage to be removed.

In operation, when the ripple voltage rises, that is, when an output voltage Va of the constant voltage power supply unit 101 rises, a current flowing through the resistor Ra is increased and the increased current charges the capacitor Ca and raises a voltage across the capacitor Ca. However, since the time constant of the resistor Ra and the capacitor Ca is adjusted so as to be long enough compared with the ripple frequency, the voltage across the capacitor Ca does not change significantly during the period of the ripple voltage rising. As a result, a base voltage of the NPN transistor Qa is stable and therefore a voltage Voa at the output terminal OUTa does not change significantly.

On the other hand, when the ripple voltage falls down, that is, when the output voltage Va of the constant voltage power supply unit 101 is lowered, the current flowing through the resistor Ra is decreased and the capacitor Ca discharges. However, since the voltage across the capacitor does not actually change significantly during the period of the ripple voltage falling, the base voltage of the NPN transistor Qa is stable, and therefore the voltage Voa at the output terminal OUTa does not change significantly.

FIG. 6 is a block diagram of another type of conventional constant voltage power supply circuit. The constant voltage power supply circuit shown in FIG. 6 has a DC/DC converter 105, and a series regulator 106 connected between an output end of the DC/DC converter and an output terminal of the constant voltage power circuit. The DC/DC converter 105 inherently generates a high frequency ripple voltage in its output voltage. The ripple voltage is removed by the series regulator 106.

[Patent reference 1] JPA 5-95628

The constant voltage power supply circuit shown in FIG. 5 generates a large voltage drop between the output end A of the constant voltage power supply unit 101 and the output terminal OUTa. The voltage of the capacitor Ca must be higher than the output voltage Voa by a base-emitter voltage Vbe for the NPN transistor Qa. The capacitor Ca is charged through the resistor Ra and therefore the output voltage Va of the constant voltage power supply unit 101 must be high, and therefore power supply efficiency is degraded.

In order to make the time constant of the resistor Ra and the capacitor Ca large enough, either a resistance value of the resistor Ra or a capacitance of the capacitor Ca must be made large.

If the resistance value of the resistor Ra is made large, a base current of the NPN transistor Qa is reduced. It is not desired to reduce the base current of the NPN transistor Qa, because all the current supplied to the output terminal OUTa and a load (not shown) connected thereto flows through the NPN transistor Qa. Therefore, if the resistance value of the resistor Ra becomes large, the output voltage Va of the constant voltage power supply unit 101 should be larger in order to give enough base current of the NPN transistor Qa. As a result, the voltage drop across the NPN transistor Qa is further increased, and therefore the power supply efficiency is degraded.

On the other hand, if the capacitance of the capacitor Ca is made large, the large size of the capacitance Ca makes it impossible to integrate the capacitor Ca and the capacitor Ca has to be externally attached.

Also in the constant voltage power supply circuit shown in FIG. 6, the series regulator 106 has a voltage drop. When an output current of the series regulator 106 is large, the voltage drop thereof also becomes large, resulting in degradation of the power supply efficiency.

DISCLOSURE OF THE INVENTION

It is a general object of the present invention to provide a constant voltage power supply circuit that can cancel a ripple voltage while maintaining high voltage efficiency.

Features and advantages of the present invention are set forth in the description that follows, and in part will become apparent from the description and the accompanying drawings, or may be learned by practice of the invention according to the teachings provided in the description. Objects as well as other features and advantages of the present invention will be realized and attained by an information recording apparatus and a method thereof particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides as follows.

According to one aspect of the present invention, in a constant voltage power supply circuit having an input terminal, an output terminal, a constant voltage power supply unit that generates a constant voltage with a ripple voltage, and a ripple removing circuit unit for removing the ripple voltage so that a constant voltage without the ripple voltage is output at the output terminal, the ripple removing circuit unit comprises:

a resistor connected between the constant voltage power supply unit and the output terminal;

a ripple voltage detection circuit unit for detecting the ripple voltage and outputting a signal depending on the detected ripple voltage; and a current circuit unit for receiving a signal from the ripple voltage detection circuit unit and supplying a current to the output terminal or absorbing a current from the resistor in response to the received signal, so as to cancel the ripple voltage at the output terminal.

The current circuit unit may supply a current when the received signal indicates that the ripple voltage is negative, and may absorb a current when the received signal indicates that the ripple voltage is positive.

The current circuit unit may comprise a current supplying circuit unit and a current absorbing circuit unit.

The current supplying circuit unit may vary the supplied current depending on the received signal, and the current absorbing circuit unit may vary the absorbed current depending on the received signal.

The product of a resistance value of the resistor and the supplied or absorbed current may be equal to the ripple voltage.

The ripple removing circuit unit may further comprise a capacitor connected between the output terminal and an output of the current circuit unit.

The ripple voltage detection circuit unit may receive the voltage from the constant voltage power supply unit, compare the received voltage with a reference voltage, and output the signal in accordance with the comparison.

The constant voltage power supply unit and the ripple removing circuit unit may be integrated into one IC.

BEST MODE FOR CARRYING OUT THE INVENTION

In the following, an embodiment of the present invention is described with reference to the accompanying drawings.

Figure 1:
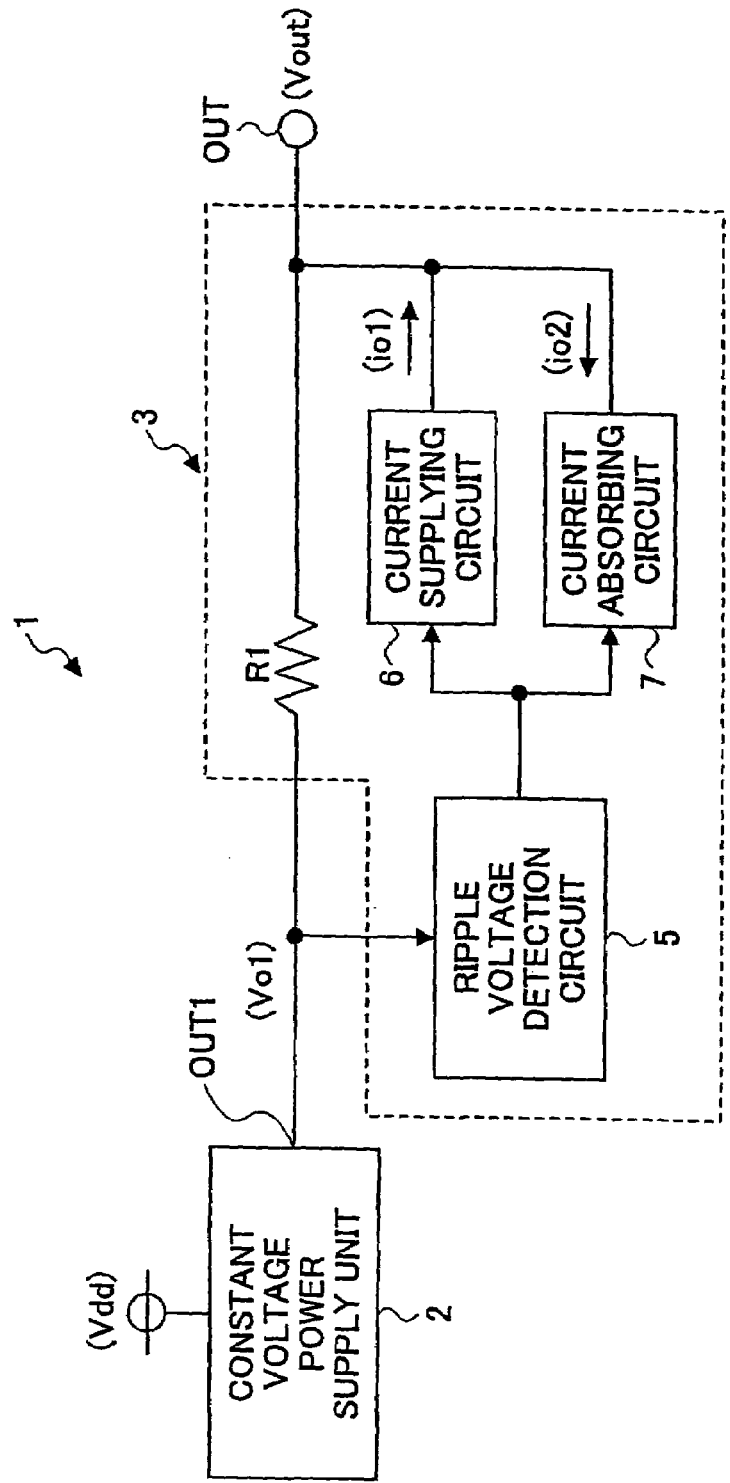
FIG. 1 is a block diagram of a constant voltage power supply circuit according to an embodiment of the present invention.

The embodiment of the present invention is explained with reference to FIG. 1 through FIG. 4. FIG. 1 is a block diagram of a constant voltage power supply circuit 1 according to the embodiment of the present invention.

The constant voltage power supply circuit 1 comprises a constant voltage power supply unit 2 that receives a power supply voltage Vdd and is ideally desired to generate and output a predetermined constant voltage V1, and a ripple removing circuit unit 3 connected between an output end OUT1 of the constant voltage power supply unit 2 and an output terminal OUT of the constant voltage power supply circuit 1.

The ripple removing circuit unit 3 comprises a resistor R1 connected between the output end OUT1 of the constant voltage power supply unit 2 and the output terminal OUT, a ripple voltage detection circuit 5 for detecting a ripple voltage Vri appearing in an actual output voltage Vo1 of the constant voltage power supply unit 2, a current supplying unit 6 for supplying a current io1 to the output terminal OUT in accordance with an output signal from the ripple voltage detection circuit 5, and a current absorbing circuit 7 for absorbing a current io2 via the resistor R1 in accordance with the output signal from the ripple voltage detection circuit 5. The ripple voltage detection circuit 5 is an example of a ripple voltage detection circuit unit, the current supplying circuit 6 is an example of a current supplying circuit unit, and the current absorbing circuit 7 is an example of a current absorbing circuit unit. The combination of the current supplying circuit unit and the current absorbing circuit unit is an example of a current circuit unit. It is desirable that the constant voltage power supply unit and the ripple removing circuit unit be integrated into one IC.

To an input end of the ripple voltage detection circuit 5, the output voltage Vo1 of the constant voltage power supply unit 2 is input. An output signal of the ripple voltage detection circuit 5 is input to the current supplying circuit 6 and the current absorbing circuit 7. The current io1 supplied from the current supplying circuit 6 is output to the output terminal OUT. The current io2 absorbed by the current absorbing circuit 7 is input via the resistor R1 to the current absorbing circuit 7.

Figure 2:
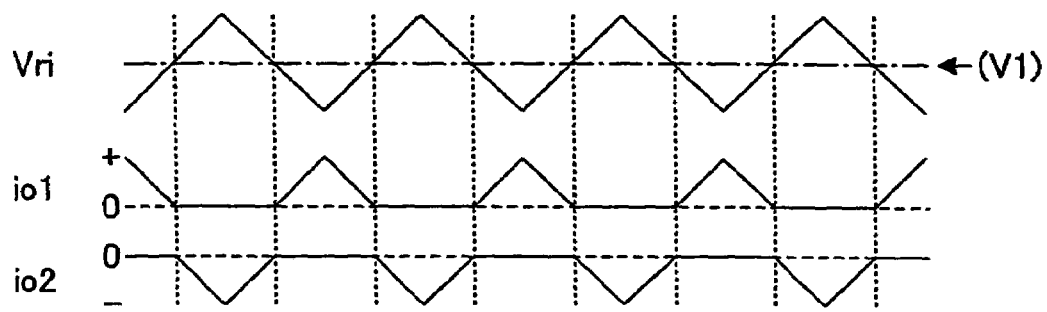
FIG. 2 shows a current io1 supplied by a current supplying circuit and a current io2 absorbed by a current absorbing circuit in response to a ripple voltage Vri.

In this structure, the ripple removing circuit unit 3 operates in a manner shown in FIG. 2. FIG. 2 illustrates the ripple voltage Vri superposed on the constant voltage V1 output from the constant voltage power supply unit 2, the output current io1 supplied from the current supplying circuit 6 in response to the ripple voltage Vri, and the output current io2 absorbed by the current absorbing circuit 7 in response to the ripple voltage Vri.

In FIG. 2, when the ripple voltage Vri is negative, that is, when the output voltage Vo1 of the constant voltage power supply unit 2 is lower than the constant voltage V1, the current absorbing circuit 7 stops its operation and the current supplying circuit 6 operates. The current io1 supplied from the current supplying circuit 6 varies according to the ripple voltage Vri, and becomes larger as the ripple voltage Vri becomes lower. When the supplied current io1 becomes larger, a current flowing through the resistor R1 is reduced and a voltage drop over the resistor R1 is also reduced, and that prevents an output voltage Vout at the output terminal OUT from falling down.

A resistance amount of the resistor R1 and/or an amount of the supplied current io1 from the current supplying circuit 6 can be adjusted so that the reduction in the voltage drop across the resistor R1 due to the supplied current io1 is equal to the ripple voltage decrease from the constant voltage V1. In this manner, it is possible to prevent the output voltage Vout at the output terminal OUT from falling down.

Next, when the ripple voltage Vri is positive, that is, when the output voltage Vo1 of the constant voltage power supply unit 2 is higher than the constant voltage V1, the current supplying circuit 6 stops its operation and the current absorbing circuit 6 operates. The current io2 absorbed by the current supplying circuit 7 varies according to the ripple voltage Vri, and becomes larger as the ripple voltage Vri becomes higher. When the absorbed current io2 becomes larger, a current flowing through the resistor R1 increases and a voltage drop across the resistor R1 also increases, and that prevents the output-voltage Vout at the output terminal OUT from rising up.

A resistance amount of the resistor R1 and/or an amount of the absorbed current io2 by the current absorbing circuit 6 can be adjusted so that the increment in the voltage drop across the resistor R1 due to the absorbed current io2 is equal to the ripple voltage increment from the constant voltage V1. In this manner, it is possible to prevent the output voltage Vout at the output terminal OUT from rising up.

Figure 3:
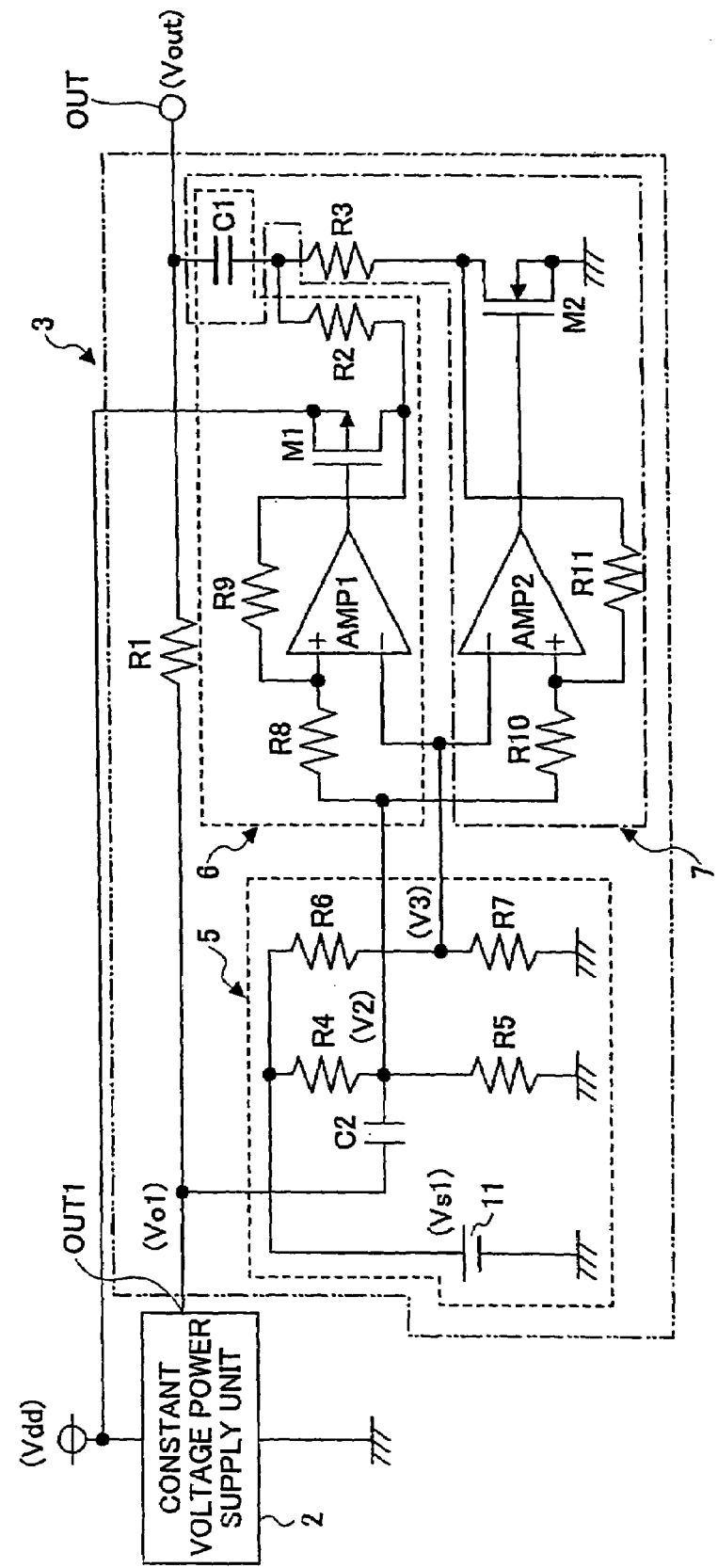
FIG. 3 shows an example circuit of a ripple removing circuit unit 3 shown in FIG. 1.

FIG. 3 shows a circuit example of the ripple removing circuit unit 3. The ripple voltage detection circuit 5 comprises a reference voltage generating circuit 11 for generating a predetermined voltage Vs1, a capacitor C2, and two pairs of resistors R4, R5 and R6, R7. The current supplying circuit 6 comprises an operational amplifier AMP1, a PMOS transistor M1, a capacitor C1, and resistors R2, R8 and R9. The current absorbing circuit 7 comprises an operational amplifier AMP2, a NMOS transistor M2, the capacitor C1, and resistors R3, R10 and R11. The capacitor C1 is an example of a first capacitor, the capacitor C2 is an example of a second capacitor, the pair of resistors R4 and R5 is an example of a first voltage dividing circuit, and the pair of resistors R6 and R7 is an example of a second voltage dividing circuit.

Between the reference voltage Vs1 and the ground voltage, the serially coupled resistors R4 and R5 and the serially coupled resistors R6 and R7 are connected in parallel.

A node between the resistor R4 and the resistor R5 is coupled to the output end OUT1 of the constant voltage power supply unit 2 via the capacitor C2. The node between the resistor R4 and the resistor R5 is further coupled via the resistor R8 to a non-inverting input of the operational amplifier AMP1 and coupled via the resistor R10 to a non-inverting input of the operational amplifier AMP2.

A node between the resistor R6 and the resistor R7 is coupled to inverting inputs of the operational amplifiers AMP1 and AMP2.

To an output end of the operational amplifier AMP1, a gate of the PMOS transistor M1 is connected. To an output end of the operational amplifier AMP2, a gate of the NMOS transistor M2 is connected. Between the power supply voltage Vdd and the ground voltage, the PMOS transistor M1, the resistor R2, the resistor R3 and the NMOS transistor M2 are connected in series. A node between the resistor R2 and the resistor R3 is coupled to the output terminal OUT via the capacitor C1. The capacitor C1 is for cutting a direct current voltage.

A node between a drain of the PMOS transistor M1 and the resistor R2 is connected via the resistor R9 to the non-inverting input of the operational amplifier AMP1. A node between the resistor R3 and the NMOS transistor M2 is connected via the resistor R11 to the non-inverting input of the operational amplifier AMP2.

In this structure, the current supplying circuit 6 has an inverting amplifying circuit formed by the operational amplifier AMP1 and the PMOS transistor M1, and its amplification factor is generally represented by the resistance value of the resistor R9 divided by the resistance value of the resistor R8. Similarly, the current absorbing circuit 7 has an inverting amplifying circuit formed by the operational amplifier AMP2 and the NMOS transistor M2, and its amplification factor is generally represented by the resistance value of the resistor R11 divided by the resistance value of the resistor R10.

The resistance amounts of the resistors R4 ~R7 are adjusted so that a ratio of the resistor R4 and the resistor R5 is equal to a ratio of the resistor R6 and the resistor R7. In this manner, when there is no ripple voltage, a voltage V2 at the node between the resistor R4 and the resistor R5 is equal to a voltage V3 at the node between the resistor R6 and the resistor R7.

When a ripple voltage appears in the output voltage Vo1 of the constant voltage power supply unit 2, the ripple voltage varies the voltage V2 at the node between the resistor R4 and the resistor R5 through the capacitor C2. On the other hand, the voltage V3 at the node between the resistor R6 and the resistor R7 is not varied. Therefore, a voltage difference between the voltages V2 and V3 is input to the current supplying circuit 6 and the current absorbing circuit 7 and amplified therein, and appears at the drains of the PMOS transistor M1 and the NMOS transistor M2.

When the voltage V2 is lower than the voltage V3, that is, when the ripple voltage Vri is negative, the voltage difference is amplified by the current supplying circuit 6 and the current absorbing circuit 7, and the amplified voltages turn on the PMOS transistor M1 and turn off the NMOS transistor M2, respectively, and therefore raise the drain voltage of the PMOS transistor M1 and the source voltage of the NMOS transistor M2, and raise the voltage at the node between the resistors R2 and R3. The raised voltage is applied via the capacitor C1 to the output terminal OUT and prevents the voltage at the output terminal OUT from falling down. The current io1 supplied from the current supplying circuit 6 to the output terminal OUT is determined by the amplification factor of the current supplying circuit 6 and the resistance value of the resistor R2. As mentioned with reference to FIGS. 1 and 2, the ripple voltage Vri can be cancelled at the output terminal OUT by adjusting so that the product of the current io1 and the resistor R1 is equal to the ripple voltage Vri.

On the other hand, when the voltage V2 is higher than the voltage V3, that is, when the ripple voltage Vri is positive, the voltage difference is amplified by the current supplying circuit 6 and the current absorbing circuit 7, and the amplified voltages turn off the PMOS transistor M1 and turn on the NMOS transistor M2, respectively, and therefore lower the drain voltage of the PMOS transistor M1 and the source voltage of the NMOS transistor M2, and lower the voltage at the node between the resistors R2 and R3. The lowered voltage is applied via the capacitor C1 to the output terminal OUT and prevents the voltage at the output terminal OUT from rising up. The current io2 absorbed by the current absorbing circuit 7 from the resistor R1 is determined by the amplification factor of the current absorbing circuit 7 and the resistance value of the resistor R3. As mentioned with reference to FIGS. 1 and 2, the ripple voltage Vri can be cancelled at the output terminal OUT by adjusting so that the product of the current io2 and the resistor R1 is equal to the ripple voltage Vri. Since the resistors R8~R11 are larger than resistors R2 and R3 enough, the currents supplied and absorbed through the resistors R2 and R3 to and from the output terminal OUT are not substantially affected.

In FIG. 3, the current supplying circuit 6 and the current absorbing circuit 7 are formed by the two operational amplifiers AMP1 and AMP2, respectively. However, the current supplying circuit and the current absorbing circuit can be formed by one operational amplifier AMP1 as shown in FIG. 4.

Figure 4:
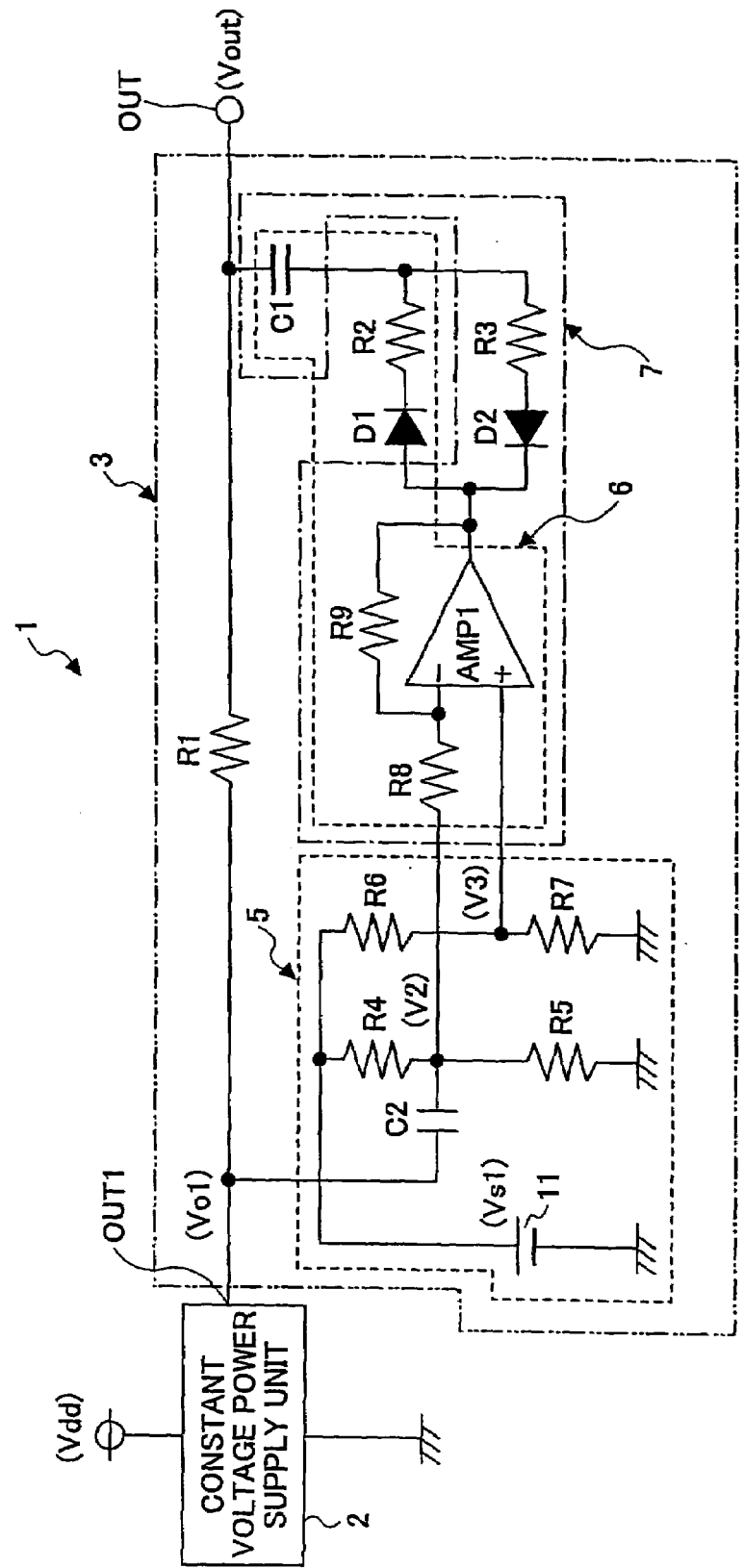
FIG. 4 shows another example circuit of the ripple removing circuit unit 3 shown in FIG. 1.
Figure 5:
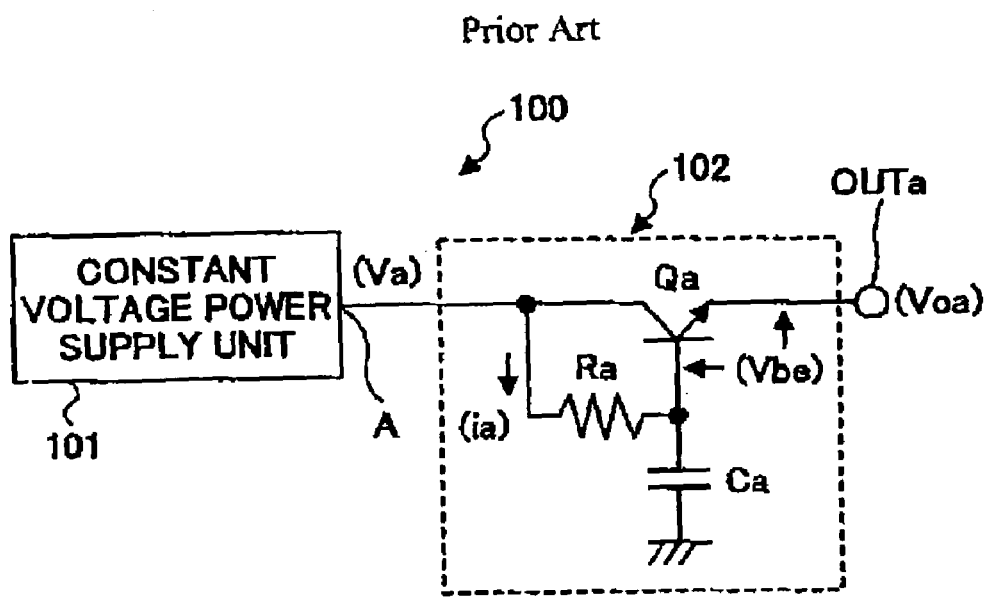
FIG. 5 shows a conventional constant voltage power supply circuit using a ripple filter.
Figure 6:
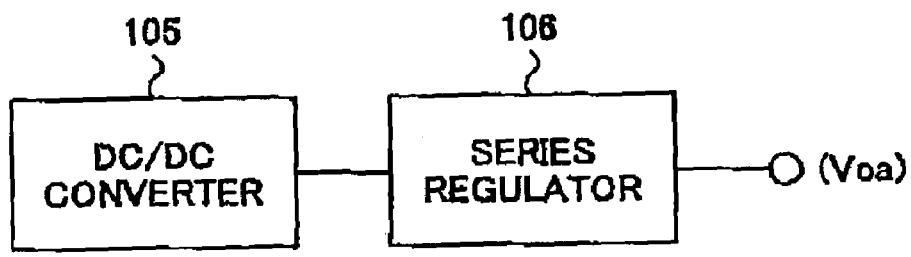
FIG. 6 shows another type of conventional constant voltage power supply circuit.

Members shown in FIG. 4 that are the same as or similar to the members shown in FIG. 3 are assigned the same or similar alphanumeric references and their explanations are omitted. Only points different from FIG. 3 are explained below.

In an example shown in FIG. 4, compared with FIG. 3, the operational amplifier AMP2, the PMOS transistor M1, the NMOS transistor M2 and the resistors R10, R11 are removed, and diodes D1 and D2 are added.

A current supplying circuit 6 shown in FIG. 4 comprises an operational amplifier AMP1, the diode D1, a capacitor C1 and resistors R2, R8 and R9. A current absorbing circuit 7 shown in FIG. 4 comprises the operational amplifier AMP1, the diode D2, the capacitor C1 and resistors R3, R8 and R9.

A node between the resistor R4 and the resistor R5 is coupled via the resistor R8 to an inverting input of the operational amplifier AMP1. A node between the resistor R6 and the resistor R7 is coupled to a non-inverting input of the operational circuit AMP1. The resistor R9 is connected between the non-inverting input and an output of the operational amplifying circuit AMP1. One end of the capacitor C1 is connected to the output terminal OUT. Between another end of the capacitor C1 and the output end of the operational amplifying circuit AMP1, serially connected diode D1 and resistor R2 and serially connected diode D2 and resistor R3 are coupled in parallel.

In operation, the ripple voltage Vri is amplified by an inverting amplifying circuit formed by the operational amplifying circuit AMP1 and the resistors R8, R9. When the ripple voltage Vri is negative, the output voltage of the operational amplifying circuit AMP1 is raised and the operational amplifying circuit AMP1 supplies a current io1 through the diode D1 and the resistor R2 to the output terminal OUT. When the ripple voltage Vri is positive, the output voltage of the operational amplifying circuit AMP1 falls down and the operational amplifying circuit AMP1 absorbs a current io2 through the diode D2 and the resistor R3 from the resistor R1. If the current supplied to the output terminal OUT and the current absorbed from the resistor R1 are equal to each other, the diodes D1 and D2 can be omitted and the resistors R2 and R3 can be combined into one resistor, which is connected between the operational amplifying circuit AMP1 and the capacitor C1.

In the examples shown in FIGS. 3 and 4, the current supplying circuit 6 and the current absorbing circuit 7 share one capacitor C1 in common. Alternatively, each of the current supplying circuit 6 and the current absorbing circuit 7 may be provided with a capacitor C1, each of which is connected between the resistor R2 and the output terminal OUT and between the resistor R3 and the output terminal OUT, respectively.

In the constant voltage power supply circuit according to the embodiment of the present invention, when the ripple voltage Vri is negative, that is, when the output voltage Vo1 is lower than the constant voltage V1, the current absorbing circuit 7 stops its operation and the current supplying circuit 6 operates. An amount of the current io1 supplied by the current supplying circuit 6 becomes larger as the ripple voltage Vri is smaller. When the ripple voltage Vri is positive, that is, when the output voltage Vo1 is higher than the average voltage V1, the current supplying circuit 6 stops its operation and the current absorbing circuit 7 operates. An amount of the current io2 absorbed by the current absorbing circuit 7 becomes larger as the ripple voltage Vri is larger. Accordingly, the ripple voltage of the output voltage Vo1 of the constant voltage power supply unit 2 can be cancelled. The voltage drop between the output end OUT1 of the constant voltage power supply unit 2 and the output terminal OUT of the constant voltage power supply circuit 1 can be reduced, and therefore power supplying efficiency can be improved when outputting a large current.

Further, the present invention is not limited to the above embodiment, but variations and modifications may be made without departing from the scope of the present invention.

The present application is based oh Japanese Priority Application No. 2004-308369 filed on Oct. 22, 2004 with the Japanese Patent Office, the entire contents of which are hereby incorporated by reference.

The invention claimed is:

1. A constant voltage power supply circuit having an input terminal, an output terminal, a constant voltage power supply unit that generates a constant voltage with a ripple voltage, and a ripple removing circuit unit for removing the ripple voltage so that a constant voltage without the ripple voltage is output at the output terminal,
   the ripple removing circuit unit comprising:
   a resistor connected between the constant voltage power supply unit and the output terminal;
   a ripple voltage detection circuit unit for detecting the ripple voltage and outputting a signal depending on the detected ripple voltage; and
   a current circuit unit for receiving a signal from the ripple voltage detection circuit unit and supplying current to the output terminal or absorbing a current from the resistor in response to the received signal, so as to cancel the ripple voltage at the output terminal.

2. The constant voltage power supply circuit as claimed in claim 1, wherein
   the current circuit unit supplies a current when the received signal indicates that the ripple voltage is negative, and absorbs a current when the received signal indicates that the ripple voltage is positive.

3. The constant voltage power supply circuit as claimed in claim 1, wherein
   the current circuit unit comprises a current supplying circuit unit and a current absorbing circuit unit.

4. The constant voltage power supply circuit as claimed in claim 3, wherein
   the current supplying circuit unit varies the supplied current depending on the received signal, and the current absorbing circuit unit varies the absorbed current depending on the received signal.

5. The constant voltage power supply-circuit as claimed in claim 1, wherein
   the product of a resistance value of the resistor and the supplied or absorbed current is equal to the ripple voltage.

6. The constant voltage power supply-circuit as claimed in claim 1, wherein
   the ripple removing circuit unit further comprises a capacitor connected between the output terminal and an output of the current circuit unit.

7. The constant voltage power supply-circuit as claimed in claim 1, wherein
   the ripple voltage detection circuit unit receives the voltage from the constant voltage power supply unit, compares the received voltage with a reference voltage, and outputs the signal in accordance with the comparison.

8. The constant voltage power supply circuit as claimed in claim 1, wherein
   the constant voltage power supply unit and the ripple removing circuit unit are integrated into one IC.

* * * * *